United States Patent [19]

Negi et al.

[11] Patent Number: 4,645,695

[45] Date of Patent: Feb. 24, 1987

[54] RESINOUS COMPOSITION AND MOLDED ARTICLE AND CONTAINER MADE THEREOF

[75] Inventors: Taichi Negi; Akihiko Kawasaki; Kyoichiro Ikari, all of Kurashiki, Japan

[73] Assignee: Kuraray Co., Ltd., Kurashiki, Japan

[21] Appl. No.: 768,745

[22] Filed: Aug. 23, 1985

[30] Foreign Application Priority Data

Sep. 6, 1984 [JP] Japan ................... 59-187598

[51] Int. Cl.$^4$ .................. C08L 29/04; B65D 1/00
[52] U.S. Cl. ..................... 428/35; 428/515; 428/520; 525/57; 525/222
[58] Field of Search ............ 525/57, 56, 222; 428/35, 515, 520

[56] References Cited

U.S. PATENT DOCUMENTS

| | | | |
|---|---|---|---|
| 3,847,728 | 11/1974 | Hirata et al. | 525/57 |
| 3,932,692 | 1/1976 | Hirata et al. | 525/57 |
| 4,228,250 | 10/1980 | Pritchett | 525/57 |
| 4,281,045 | 7/1981 | Sumi et al. | 428/515 |
| 4,451,599 | 5/1984 | Odorzynski et al. | 525/57 |
| 4,500,677 | 2/1985 | Maruhashi et al. | 525/57 |

FOREIGN PATENT DOCUMENTS 0041781 10/1977 Japan ................... 525/57

*Primary Examiner*—John E. Kittle
*Assistant Examiner*—James J. Seidleck
*Attorney, Agent, or Firm*—Kramer and Brufsky

[57] ABSTRACT

A resinous composition which comprises (A) 95 to 50 parts by weight of a saponified product of ethylene-vinyl acetate copolymer and (B) 5 to 50 parts by weight of a product formed by modifying ethylene-vinyl carboxylate ester copolymer or ethylene-acrylate ester copolymer with an $\alpha,\beta$-unsaturated carboxylic acid or anhydride thereof. This resinous composition can be made by melt extrusion into a molded article which is superior in impact resistance to that formed from the component (A) alone. The resinous composition can also be made into an inner layer or interlayer of a laminated container. This container is suitable for bottles of foods and agricultural chemicals because of its outstanding impact resistance, organic solvent resistance, and oxygen barrier properties.

17 Claims, No Drawings

RESINOUS COMPOSITION AND MOLDED ARTICLE AND CONTAINER MADE THEREOF

BACKGROUND OF THE INVENTION

1. Field of the Invention

The present invention relates to a resinous composition based on a saponified product of ethylene-vinyl acetate copolymer (referred to as EVOH hereinafter) and to an impact-resistant molded article and container made of said resinous composition.

2. Description of the Prior Art

EVOH is a thermoplastic resin which is incomparably superior to other resins in oil resistance, organic solvent resistance, stiffness, hardness, abrasion resistance, and oxygen barrier properties. However, it has a disadvantage of being poor in impact resistance and hard and brittle. There are some known methods for improving the impact resistance of EVOH by blending a rubber-like material. For example, there is disclosed in Japanese Patent Publication No. 3185/1967 the improvement by blending an ethylene-vinyl carboxylate copolymer or ethylene-acrylate copolymer. These methods are still inadequate in improvement in impact resistance and moldability because of the poor dispersion of the resin to be blended.

Another example of the blended EVOH is disclosed in Japanese Patent Laid-open No. 131033/1980. According to the disclosure, a resinous composition is produced by blending 50 to 97 parts by weight of EVOH and 50 to 3 parts by weight of thermoplastic polyolefin copolymer having the carbonyl group (—C=O) derived from an unsaturated carboxylic acid or anhydride thereof. (Examples of such copolymers include maleic anhydride-grafted polyethylene, ionomer, ethylene-vinyl acetate copolymer, and ethylene-acrylate copolymer.) This resinous composition finds use as packaging materials that can be easily cut with an edged tool. Even this resinous composition lacks satisfactory impact resistance and forms gel at the time of molding.

Further Japanese Patent Laid-open No. 86579/1975 discloses a composition composed of EVOH and a polyolefin (e.g., polyethylene) modified with an unsaturated polybasic carboxylic acid. It also discloses a multilayered blow-molded container made by coextrusion of the composition and a polyolefin. They still have the same disadvantages as mentioned above. This will be understood from the comparative examples mentioned later.

SUMMARY OF THE INVENTION

In order to overcome the above-mentioned disadvantages, the present inventors carried out a series of researches which led to the findings that the impact resistance of EVOH is greatly improved when EVOH is incorporated with a product obtained by adding a $C_3$-$C_{10}$ $\alpha,\beta$-unsaturated carboxylic acid or an anhydride thereof to an ethylene-vinyl carboxylate copolymer or ethylene-acrylate copolymer. The present invention is based on these findings. The EVOH composition of this invention is comparable to simple EVOH in oil resistance, organic solvent resistance, and oxygen barrier properties.

Accordingly, it is an object of the present invention to provide a resinous composition which comprises (A) 95 to 50 parts by weight of EVOH and (B) 5 to 50 parts by weight of modified ethylene-vinyl carboxylate copolymer or modified ethylene-acrylate copolymer comprising ethylene, vinyl carboxylate or acrylate, and $C_3$-$C_{10}$ $\alpha,\beta$-unsaturated carboxylic acid or anhydride thereof, wherein said modified ethylene-vinyl carboxylate copolymer or modified ethylene-acrylate copolymer contains 60 to 95 mol% of ethylene and 0.01 to 3 mol% of $\alpha,\beta$-unsaturated carboxylic acid or anhydride thereof and has a melt index of Y g/10 min (190° C., 2160 g), where Y is the value that satisfies the following equation.

$$0.01 \cdot Z < Y < 100(Z + 10 \cdot X)$$

where X is the mol% of $\alpha,\beta$-unsaturated carboxylic acid or anhydride thereof, and Z is the melt index (Z g/10 min (190° C., 2160 g)) of EVOH.

It is another object of the present invention to provide a molded article produced by melt processing of the resinous composition and also to provide a container of multilayered structure formed by coextrusion of the resinous composition and a thermoplastic resin.

DETAILED DESCRIPTION OF THE INVENTION

The EVOH used in the present invention contains 20 to 60 mol%, preferably 25 to 60 mol% of ethylene and has a degree of saponification greater than 95 mol%. If the ethylene content in EVOH is lower than 20 mol%, the resulting composition has a high molding temperature which is close to the decomposition temperature, which makes molding difficult. If the ethylene content in EVOH is higher than 60 mol%, the resulting composition is poor in oil resistance and stiffness. If the degree of saponification is lower than 95 mol%, the resulting composition loses its oil resistance and heat stability.

The modified ethylene-vinyl carboxylate or modified ethylene-acrylate copolymer used in this invention contains 60 to 95 mol% of ethylene and 0.01 to 3 mol% of $\alpha,\beta$-unsaturated carboxylic acid or anhydride thereof and has a melt index of Y g/10 min (190° C., 2160 g), where Y is the value that satisfies the following equation.

$$0.01 \cdot Z < Y < 100(Z + 10 \cdot X)$$

where X is the mol% of $\alpha,\beta$-unsaturated carboxylic acid or anhydride thereof, and Z is the melt index (Z g/10 min (190° C., 2160 g)) of EVOH.

If the content (X) of $\alpha,\beta$-unsaturated carboxylic acid or anhydride thereof is less than 0.01 mol%, the modified ethylene-vinyl carboxylate or modified ethylene-acrylate ester copolymer is poor in dispersion at the time of blending and consequently poor in impact resistance. If it exceeds 3 mol%, the modified ethylene-vinyl carboxylate or modified ethylene-acrylate copolymer becomes excessively viscous during blending operation and the resulting composition is poor in moldability and physical properties. In addition, it is necessary that X, Y, and Z satisfy the above-mentioned formula, where X is the amount (mol%) of $\alpha,\beta$-unsaturated carboxylic acid or anhydride thereof, Y is the melt index of the modified ethylene-vinyl carboxylate or modified ethylene-acrylate copolymer, and Z is the melt index of the EVOH. If they are outside the values specified by the equation, the $\alpha,\beta$-unsaturated carboxylic acid or anhydride thereof does not produce a good effect or no great improvement is made in dispersion and impact resistance.

The modified ethylene-vinyl carboxylate copolymer used in this invention contains the vinyl carboxylate component represented by the formula

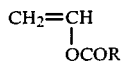

(where R is a linear or branched alkyl group having 1 to 20 carbon atoms.) Typical examples of the vinyl carboxylate include vinyl formate, vinyl acetate, vinyl propionate, vinyl butyrate, vinyl octanoate, vinyl dodecanoate, vinyl stearate, and vinyl arachinate. Preferable among them is vinyl acetate. The modified ethylene-acrylate copolymer used in this invention contains an acrylate component represented by the formula

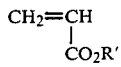

(where R' is a linear or branched alkyl group having 1 to 20 carbon atoms.) Typical examples of suitable acrylates include methyl acrylate, ethyl acrylate, propyl acrylate, butyl acrylate, 2-ethylhexylacrylate, dodecyl acrylate, octadecyl acrylate, and eicosyl acrylate. Preferable among them are methyl acrylate and ethyl acrylate.

The above-mentioned vinyl carboxylates and acrylates produce the same effect of improving the impact resistance of the resinous composition. The former permits the resinous composition to keep its impact strength even after immersion in a surfactant solution or organic solvent for a long time. Therefore, it is suitable for the resinous composition to be made into bottles for cosmetics, liquid detergents, and agricultural chemicals. On the other hand, the acrylate ester, which has a higher decomposition temperature than vinyl carboxylates, imparts moldability at high temperatures and impact resistance at low temperatures to the resinous composition.

The modified ethylene-vinyl carboxylate copolymer and modified ethylene-acrylate copolymer used in this invention contain an $\alpha,\beta$-unsaturated carboxylic acid or anhydride thereof having 3 to 10 carbon atoms. It includes, for example, acrylic acid, methacrylic acid, ethacrylic acid, maleic acid, itaconic acid, maleic anhydride, and itaconic anhydride. Preferable among them are maleic anhydride and itaconic anhydride.

The resinous composition of this invention comprises 95 to 50 parts by weight, preferably 95 to 60 parts by weight, of EVOH and 5 to 50 parts by weight, preferably 5 to 40 parts by weight of the modified ethylene-vinyl carboxylate copolymer or modified ethylene acrylate copolymer. The preferred amount of modified ethylene-vinyl carboxylate copolymer is 5 to 40 parts by weight, and the preferred amount of modified ethylene-acrylate copolymer is 5 to 30 parts by weight. If the amount of modified ethylene-vinyl carboxylate copolymer or modified ethylene-acrylate copolymer is less than 5 parts by weight, the resulting resinous composition is not sufficiently improved in impact resistance, and if the amount is in excess of 50 parts by weight, the superior oil resistance and stiffness of EVOH are impaired.

The modified ethylene-vinyl carboxylate copolymer or modified ethylene-acrylate copolymer used in this invention may be produced in any way. It should preferably be produced by grafting an $\alpha,\beta$-unsaturated carboxylic acid or anhydride thereof to an ethylene-vinyl carboxylate copolymer or an ethylene-acrylate copolymer. In the process of producing the modified ethylene-vinyl carboxylate copolymer or modified ethylene-vinyl carboxylate copolymer, a vinyl monomer may be copolymerized in an amount less than 5 mol% without any adverse effect on the resinous composition of this invention. Also, in the process of producing the modified ethylene-vinyl carboxylate copolymer or modified ethylene-vinyl carboxylate copolymer, the former may be incorporated with an unmodified ethylene-vinyl carboxylate copolymer, or the latter may be incorporated with an unmodified ethylene-acrylate copolymer.

In the process of blending EVOH with other components, the modified ethylene-vinyl carboxylate copolymer and an unmodified ethylene-vinyl carboxylate copolymer may be blended simultaneously, or the modified ethylene-acrylate copolymer and an unmodified ethylene-acrylate copolymer may be blended simultaneously.

The blending of EVOH with the modified ethylene-vinyl carboxylate copolymer or modified ethylene-acrylate copolymer may be accomplished by the use of a Banbury mixer or a single- or twin-screw extruder. In the process of blending, other additives may be added in such an amount that the action and effect of this invention are not impaired. Examples of such additives include antioxidants, ultraviolet light absorber, plasticizer, antistatic agent, slip agent, coloring agent, filler, and other polymeric compounds. Examples of the additives are listed in the following.

Antioxidant: 2,5-di-t-butylhydroquinone, 2,6-di-t-butyl-cresol, 4,4'-thiobis-(6-t-butylphenol), 2,2'-methylene-bis(4-methyl-6-t-butylphenol, octadecyl-3-(3'-5'-di-t-butyl-4-hydroxyphenyl)propionate, and 4,4'-thiobis-(6-t-butylphenol).

Ultraviolet light absorber: Ethyl-2-cyano-3,3'-diphenylacrylate, 2-(2'-hydroxy-5'-methylphenyl)benzotriazole, 2-(2'-hydroxy-3'-t-butyl-5'-methylphenyl)-5-chlorobenzotriazole, 2-hydroxy-4-methoxybenzophenone, 2,2'-dihydroxy-4-methoxybenzophenone, and 2-hydroxy-4-octoxybenzophenone.

Plasticizer: Dimethyl phthalate, diethyl phthalate, dioctyl phthalate, wax, liquid paraffin, and phosphate ester.

Antistatic agent: Pentaerythritol monostearate, sorbitan monopalmitate, sulfonated oleic acid, polyethylene oxide, and carbowax.

Slip agent: Ethylene bis-stearamide and butyl stearate.

Coloring agent: Carbon black, phthalocyanine, quinacridone, indoline, azo-pigment, titanium oxide, and red oxide.

Filler: Glass fiber, asbestos, mica, wollastonite, calcium silicate, aluminum silicate, and calcium carbonate.

The resinous composition of this invention can be molded into film, sheet, tube, and bottle and any other desired shapes by using the known melt extrusion molding machine, compression molding machine, transfer molding machine, injection molding machine, blow molding machine, thermoforming machine, rotational molding machine, or dip molding machine. The extrusion temperature for molding should be properly selected according to the type and molecular weight of the resins, the formulation of the composition, and the performance of the extruder. It is usually in the range of 180° to 260° C. The resinous composition of this invention can be molded by coextrusion with a proper thermoplastic resin (e.g., polyethylene terephthalate, polyamide, polypropylene, polyethylene, polycarbonate, polystyrene, and polyvinyl chloride). The coextrusion provides laminated moldings which are superior in impact resistance. The resinous composition of this invention is also useful as the inner layer or interlayer of the container (bottle) made of one of the above-mentioned thermoplastic resins. The multilayered bottles can be produced by the direct blow molding (in which bottles are made from a coextruded multilayered parison), by the cold parison technique (in which multilayered pipes (parisons) are made by coextrusion and subsequently the parisons are made into bottles by biaxial orientation), or by the injection blow molding with multiple layers.

The bottles produced as mentioned above are superior in resistance to chemicals and organic solvents in the case where the inner layer is made of the resinous composition of this invention. Therefore, the bottles are suitable for filling organic liquids and agricultural chemicals.

The application of the resinous composition of this invention is not limited to bottles and containers. It can be made into laminated film or sheet by coextrusion with one of the above-mentioned thermoplastic resin. In this case, the resinous composition may be used as the interlayer. The laminate (sheet) having the interlayer of the resinous composition can be made into cups or similar containers by deep draw forming. The laminate (film) having the interlayer of the resinous composition will find use as the packaging material for wine and photograph developing solution.

In the production of the above-mentioned laminates (e.g., bottles, tube, sheet, and film), it is possible to use an adhesive to bond the layer of the resinous composition of this invention to the layer of the thermoplastic resin. The interlaminar adhesive is not specifically limited so long as it firmly bonds the two layers together. A preferred one is a product obtained by modifying (e.g., grafting) a thermoplastic resin (e.g., polyethylene, polypropylene, ethylene-vinyl acetate copolymer, and ethylene-acrylate copolymer) with 0.005 to 5 wt% of unsaturated carboxylic acid or anhydride thereof (e.g., maleic anhydride).

The invention is now described in more detail with reference to the following examples. The test methods and evaluation methods used in the examples and comparative examples are as follows:

Melt Index (MI)

Expressed in terms of the amount of resin which emerges from the melt indexer for 10 minutes when a load of 2160 g is applied at 190° C. according ASTM D-1238.

Izod Impact Strength

Measured for bone-dry notched specimens according to ASTM D-256 at 20° C.

Falling Ball Impact Test

A 3.3 kg weight is dropped on a flat specimen measuring 100 mm×100 mm×2 mm according to JIS K7211, and the height of dropping is increased gradually to a point where 50% of the specimens tested are broken. This height is recorded.

Dropping Test

A blow-molded bottle filled with water and immediately stoppered thereafter is dropped in the vertical position from a varied height onto a concrete floor at 20° C. and 65 %RH. The same bottle is dropped ten times at maximum or as many times as can be repeated until the bottle is broken. The height and the number of repetition are recorded. This test is performed by using ten bottles and the result is indicated by the average value (integer).

Loss of Content

A 500 cc blow-molded bottle is filled with 500 cc of xylene, and the filled bottle is allowed to stand at 50° C. for one month. The change in weight is recorded.

DROP BURSTING TEST

A 10-liter blow-molded container filled with 10 liters of water and immediately stoppered thereafter is dropped in the vertical position from a varied height onto a concrete floor at 20° C. and 65 %RH. The same container is dropped ten times at maximum or as many times as can be repeated until the container is broken. The height and the number of repetition are recorded. This test is performed by using ten containers and the result is indicated by the average value (integer).

EXAMPLE 1

EVOH specified below (1) and a modified ethylene-vinyl carboxylate copolymer specified below (2) were blended with each other at different blending ratios at 220° C. for 5 minutes by using a laboratory plast mill made by Toyo Sieki Co., Ltd.

(1)
Content of ethylene: 31 mol%
Degree of saponification: 99.6%
Melt index: 1.3 g/10 min (190° C. and 2160 g)

(2)
Modified by grafting maleic anhydride onto an ethylene-vinyl acetate copolymer.
Content of ethylene: 90 mol%
Content of vinyl acetate: 9.3 mol%
Content of maleic anhydride: 0.7 mol%
Melt index: 6 g/10 min (190° C., 2160 g)

The resulting blend was compression molded at 220° C. by using a standard mold. The molded article measuring 2.5 in.×½ in.×⅛ in. was examined for Izod impact strength. The results are shown in Table 1.

COMPARITIVE EXAMPLE 1

The molded test piece was prepared from the EVOH alone which was used in Example 1. The Izod impact strength of this test piece (with notch) was 1.1 kg.cm/cm.

COMPARATIVE EXAMPLE 2

90 parts by weight of the same EVOH as used in Example 1 and 10 parts by weight of ethylene-vinyl acetate copolymer containing 88 mol% of ethylene and having a melt index of 6 g/10 min (at 190° C., 2160 g) were blended and the resulting blend was examined in the same manner as in Example 1. The Izod impact strength of the test piece was 4.7 kg.cm/cm.

COMPARATIVE EXAMPLE 3

The same test as in Example 1 was performed except that the blending ratio was changed. The amount of EVOH was 97 parts by weight and the amount of modified ethylene-vinyl carboxylate copolymer was 3 parts from the EVOH alone which was used in Example 1. The results are shown in Table 2.

TABLE 2

| | EVOH | | | Maleic anhydride-modified EVA copolymer | | | | Izod impact strength (kg · cm/cm) | Falling ball impact test (cm) |
|---|---|---|---|---|---|---|---|---|---|
| | Content of ethylene (mol %) | Melt index (g/10 min) | Parts by weight | Content of ethylene (mol %) | Content of maleic anhydride (mol %) | Melt index (g/10 min) | Parts by weight | | |
| Example 2 | 31 | 1.3 | 90 | 88 | 0.7 | 0.8 | 10 | 8.6 | 61 |
| Comparative Example 4 | 31 | 1.3 | 100 | — | — | — | — | 1.6 | 40 |

TABLE 1

| | EVOH | | | Maleic anhydride-modified EVA copolymer | | | | Izod impact strength (kg · cm/cm) |
|---|---|---|---|---|---|---|---|---|
| | Content of ethylene (mol %) | Melt index (g/10 min) | Parts by weight | Content of ethylene (mol %) | Content of maleic anhydride (mol %) | Melt index (g/10 min) | Parts by weight | |
| Example 1 | 31 | 1.3 | 95 | 90 | 0.7 | 6 | 5 | 6.0 |
| Example 1 | 31 | 1.3 | 90 | 90 | 0.7 | 6 | 10 | 8.6 |
| Example 1 | 31 | 1.3 | 80 | 90 | 0.7 | 6 | 20 | 72.4 |
| Example 1 | 31 | 1.3 | 70 | 90 | 0.7 | 6 | 30 | 24.8 |
| Example 1 | 31 | 1.3 | 60 | 90 | 0.7 | 6 | 40 | not broken |
| Comparative Example 1 | 31 | 1.3 | 100 | — | — | — | — | 1.1 |
| Comparative Example 2 | 31 | 1.3 | 90 | 90 | — | 6 | 10 | 4.7 |
| Comparative Example 3 | 31 | 1.3 | 97 | 90 | 0.7 | 6 | 3 | 3.0 |

*EVA: Ethylene-vinyl acetate copolymer by weight. The Izod impact strength of the test piece (with notch) was 3.0 kg.cm/cm.

EXAMPLE 2

The same EVOH as used in Example 1 and a modified ethylene-vinyl carboxylate copolymer specified below were dry-blended with each other at a blending ratio of 90 parts by weight to 10 parts by weight, followed by mixing and pelletizing by a 40 mm extruder. Modified by grafting maleic anhydride onto an ethylene-vinyl acetate copolymer.
Content of ethylene: 88 mol%
Content of vinyl acetate: 11.3 mol%
Content of maleic acid: 0.7 mol%
Melt index: 0.8 g/10 min (190° C., 2160 g)
The resulting pellets were injection molded at 220° C. to prepare test pieces for Izod impace strength, each measuring 2.5 in.×½ in. ×⅛ in., and test pieces for falling ball impact test, each measuring 10 mm×10 mm×2 mm. The results are shown in Table 2.

COMPARATIVE EXAMPLE 4

The test pieces for Izod impact strength, each measuring 2.5 in.×½ in. ×⅛ in., and test pieces for falling ball impact test, each measuring 10 mm×10 mm×2 mm, were prepared by injection molding at 220° C.

COMPARATIVE EXAMPLE 5

A blend was made from 90 parts by weight of the same EVOH as used in Example 1 and 10 parts by weight of modified low-density polyethylene (containing 0.1 mol% of maleic anhydride and having a melt index of 1.3 g/10 min) produced by grafting maleic anhydride onto low-density polyethylene. The resulting blend was examined in the same manner as in Example 2. The results are shown in Table 3.

COMPARATIVE EXAMPLE 6

A blend was made from 90 parts by weight of the same EVOH as used in Example 1 and 10 parts by weight of ionomer resin ("Surlyn 1707" made by duPont). The resulting blend was examined in the same manner as in Example 2. The results are shown in Table 3.

TABLE 3

| | EVOH | | | Olefin copolymer | | | Izod impact strength (kg · cm/cm) | Falling ball impact test (cm) | Discoloration of sample |
|---|---|---|---|---|---|---|---|---|---|
| | Content of ethylene (mol %) | Melt index (g/10 min) | Parts by weight | Composition | Melt index (g/10 min) | Parts by weight | | | |
| Example 2 | 31 | 1.3 | 90 | Ethylene-vinyl acetate maleic anhydride copolymer | 0.8 | 10 | 8.6 | 61 | no |
| Comparative Example 5 | 31 | 1.3 | 90 | Maleic anhydride-modified | 1.3 | 10 | 4.8 | 25 | no |
| Comparative Example 6 | 31 | 1.3 | 90 | Ionomer | 0.9 | 10 | 7.0 | 55 | yes |

EXAMPLE 3

EVOH specified below (1) and a modified ethylene-acrylate copolymer specified below (2) were blended with each other at a blending ratio of 90 parts by weight to 10 parts by weight.
(1)
Content of ethylene: 44 mol%
Degree of saponification: 99.6%

Melt index: 6.0 g/10 min (190° C. and 2160 g)

(2)
Modified by grafting maleic anhydride onto an ethylene-ethyl acrylate copolymer.
Content of ethylene: 85 mol%
Content of ethyl acrylate: 14.9 to 13 mol%
Content of maleic anhydride: 0.1 to 2 mol%
Melt index: 0.7 g/10 min (190 ° C., 2160 g)

The resulting blend was examined in the same manner as in Example 1. The results are shown in Table 4.

COMPARATIVE EXAMPLE 7

Example 3 was repeated except that the modified ethylene-acrylate copolymer was replaced by the one containing 0 mol%, 0.005 mol%, or 3.5 mol% of maleic anhydride. The results are shown in Table 4.

In the case of modified ethylene-acrylate copolymer containing 3.0 mol% of maleic anhydride, there was a tendency that the torque of the blender increases during mixing and the composition is slightly colored. The improvement in impact strength was almost the same as that in the case where maleic anhydride is not used.

Ethylene-vinyl acetate copolymer.
Content of ethylene: 80 mol%
Melt index: 1.3 g/10 min The same EVOH as used in Example 1 and the modified ethylene-vinyl carboxylate copolymer prepared as mentioned above were blended at a blending ratio of 90 parts by weight to 10 parts by weight. The resulting blend was examined in the same manner as in Example 1. The Izod impact strength (with notch) was 8.0 kg.cm/cm.

EXAMPLE 6

A blend was made from 90 parts by weight of the same EVOH as used in Example 1, 5 parts by weight of modified ethylene-vinyl carboxylate ester copolymer specified below (1), and 5 parts by weight of ethylene-vinyl acetate copolymer specified below (2).

(1)
Modified by grafting maleic anhydride onto an ethylene-vinyl acetate copolymer.
Content of ethylene: 80 mol%
Content of vinyl acetate: 19.2 mol%

TABLE 4

| | EVOH | | | Maleic anhydride-modified EEA copolymer | | | | Izod impact strength (kg · cm/cm) | Discontinuation of sample |
| --- | --- | --- | --- | --- | --- | --- | --- | --- | --- |
| | Content of ethylene (mol %) | Melt index (g/10 min) | Parts by weight | Content of ethylene (mol %) | Content of maleic anhydride (mol %) | Melt index (g/10 min) | Parts by weight | | |
| Example 3 | 44 | 6 | 90 | 85 | 0.1 | 0.7 | 10 | 7.4 | no |
| Example 3 | 44 | 6 | 90 | 85 | 0.3 | 0.7 | 10 | 7.9 | no |
| Example 3 | 44 | 6 | 90 | 85 | 1 | 0.7 | 10 | 8.2 | no |
| Example 3 | 44 | 6 | 90 | 85 | 2 | 0.7 | 10 | 8.4 | no |
| Comparative Example 7 | 44 | 6 | 90 | 85 | 0 | 0.7 | 10 | 4.8 | no |
| Comparative Example 7 | 44 | 6 | 90 | 85 | 0.005 | 0.7 | 10 | 5.0 | no |
| Comparative Example 7 | 44 | 6 | 90 | 85 | 3.5 | 0.7 | 10 | 5.0 | yes |

*EEA: Ethylene-ethyl acrylate copolymer

EXAMPLE 4

The same EVOH as used in Example 1 and a modified ethylene-vinyl carboxylate copolymer specified below were blended with each other at a blending ratio of 90 parts by weight to 10 parts by weight in the same manner as in Example 1.
Modified by grafting maleic anhydride onto an ethylene-vinyl acetate copolymer.
Content of ethylene: 88 mol%
Content of vinyl acetate: 19.6 mol%
Content of maleic acid: 0.4 mol%
Melt index: 1.3 g/10 min (190° C., 2160 g)

The same test as in Example 1 was performed. The Izod impact strength (with notch) was 7.8 kg.cm/cm.

EXAMPLE 5

50 parts by weight of modified ethylene-vinyl carboxylate copolymer specified below (1) and 50 parts by weight of ethylene-vinyl acetate copolymer specified below (2) were blended and pelletized by using a 40-mm extruder to give modified ethylene-vinyl carboxylate copolymer.

(1)
Modified by grafting maleic anhydride onto an ethylene-vinyl acetate copolymer.
Content of ethylene: 80 mol%
Content of maleic anhydride: 0.8 mol%
Melt index: 1.3 g/10 min (2)

Content of maleic acid: 0.8 mol%
Melt index: 1.3 g/10 min (190° C., 2160 g)

(2)
Ethylene-vinyl acetate copolymer
Content of ethylene: 80 mol%
Melt index: 1.3 g/10 min.

The same test as in Example 1 was performed. The Izod impact strength (with notch) was 7.8 kg.cm/cm.

EXAMPLE 7

The Izod impact strength of the test pieces prepared in Example 2 was measured at 0° C., −20° C., −40° C. and −70° C. The results are shown in Table 5.

TABLE 5

| Measuring temperature | 0° C. | −20° C. | −40° C. | −70° C. |
| --- | --- | --- | --- | --- |
| Izod impact strength (kg · cm/cm) | 7.8 | 6.5 | 4.0 | 3.0 |

EXAMPLE 8

A blend was prepared in the same manner as in Example 2 from 90 parts by weight of the same EVOH as used in Example and 10 parts by weight of the same modified ethylene-acrylate copolymer as used in Example 3. The blend was made into test pieces for Izod impact strength test in the same manner as in Example 2. Izod impact strength was measured at 0° C., −20° C., −40° C. and −70° C. The results are shown in Table 6.

TABLE 6

| Measuring temperature | 0° C. | −20° C. | −40° C. | −70° C. |
|---|---|---|---|---|
| Izod impact strength (kg · cm/cm) | 7.4 | 6.4 | 5.8 | 5.1 |

COMPARATIVE EXAMPLE 8

The Izod impact strength of the test pieces prepared in Comparative Example 4 was measured at 0° C., −20° C., −40° C. and −70° C. The results are shown in Table 7.

TABLE 7

| Measuring temperature | 0° C. | −20° C. | −40° C. | −70° C. |
|---|---|---|---|---|
| Izod impact strength (kg · cm/cm) | 1.0 | 0.9 | 0.8 | 0.8 |

EXAMPLE 9

The test pieces for Izod impact strength test prepared in Example 2 were immersed in a xylene solution (containing a surfactant) of DDVP (dimethyldichlorovinyl phosphate), which is an agricultural chemical, at 40° C. for 30 days. The Izod impact strength measured after immersion was 8.0 kg.cm/cm.

EXAMPLE 10

The test pieces for Izod impact strength test prepared in Example 8 were treated in the same manner as in Example 9. The Izod impact strength measured after immersion was 6.1 kg.cm/cm.

EXAMPLE 11

Three-layered bottles (500 cc in volume) were produced by direct blow molding from three resins coextruded at 220° C. from three 40-mm extruders. To each extruder was fed the blend pellets prepared in Example 2, high-density polyethylene having a melt index of 0.8 g/10 min, and maleic anhydride-modified low-density polyethylene containing 0.004 mol% of maleic anhydride and having a melt index of 1.1 g/10 min. The outer layer (high-density polyethylene) was about 800 μm thick; the interlayer (maleic anhydride-modified low-density polyethylene) was about 100 μm thick; and the inner layer (composition prepared in Example 2) was about 100 μm thick. The bottles were examined for drop test and loss of content. The results are shown in Table 8.

COMPARATIVE EXAMPLE 9

Example 11 was repeated except that the inner layer was produced from the EVOH alone which was used in Comparative Example 1. The results are shown in Table 8.

COMPARATIVE EXAMPLE 10

Monolayered bottles (500 cc in volume) having a wall thickness of 1 mm were produced from the same high-density polyethylene as used in Example 11. The bottles were examined for drop test and loss of content. The results are shown in Table 8.

TABLE 8

| Example No. | Drop test (times/10 times) Drop height | | | Loss of content (%) |
|---|---|---|---|---|
| | 70 cm | 120 cm | 200 cm | |
| Example 11 | 10 | 10 | 10 | 0.0 |

TABLE 8-continued

| Example No. | Drop test (times/10 times) Drop height | | | Loss of content (%) |
|---|---|---|---|---|
| | 70 cm | 120 cm | 200 cm | |
| Comparative Example 9 | 2 | 1 | 0 | 0.0 |
| Comparative Example 10 | 10 | 10 | 10 | 7.0 |

EXAMPLE 12

Three-layered bottles (10 liters in volume) were produced by direct blow molding from two resins coextruded at 220° C. from three 40-mm extruders. To one of the extruders was fed the blend pellets prepared in Example 2, and to each of the remaining two extruders was fed a 50:50 mixture of the maleic anhydride-modified low-density polyethylene as used in Example 11 and low-density polyethylene having a melt index of 0.3 g/10 min. Each of the outer layer and inner layer (mixture of maleic anhydride-modified low-density polyethylene) was about 200 μm thick, and the interlayer (composition prepared in Example 2) was about 50 μm thick. The bottles were examined for drop bursting test and oxygen permeability. The results are shown in Table 9.

COMPARATIVE EXAMPLE 11

Example 12 was repeated except that the inner layer was produced from the EVOH alone which was used in Comparative Example 1. The results are shown in Table 9.

COMPARATIVE EXAMPLE 12

Monolayered bottles (10 liters in volume) having a wall thickness of 450 μm were produced from the same low-density polyethylene as used in Example 12. The bottles were examined for drop bursting test and oxygen permeability. The results are shown in Table 9.

TABLE 9

| Example No. | Drop bursting test (times/10 times) Drop height | | | Oxygen permeability (cc/day/atm)* |
|---|---|---|---|---|
| | 70 cm | 120 cm | 200 cm | |
| Example 12 | 10 | 10 | 10 | 0.2 |
| Comparative Example 11 | 4 | 1 | 1 | 0.2 |
| Comparative Example 12 | 10 | 10 | 10 | 80 |

*measured at 20° C. and 83% RH.

What is claimed is:

1. A resinous composition which comprises (A) 95 to 50 parts by weight of a saponified product of ethylene-vinyl acetate copolymer containing 20 to 60 mol % of ethylene and having a degree of saponification greater than 95%, and (B) 5 to 50 parts by weight of a modified ethylene-vinyl carboxylate copolymer or a modified ethylene-acrylate copolymer, said copolymers each being modified by a $C_3$–$C_{10}$ $\alpha,\beta$-unsaturated carboxylic acid or anhydride thereof therewith, wherein each of said modified copolymers contain 60 to 85 mol% of ethylene and 0.01 to 3 mol% of an $\alpha,\beta$-unsaturated carboxylic acid or an anhydride thereof.

2. A resinous composition as claimed in claim 1, wherein said modified ethylene-vinyl carboxylate copolymer or modified ethylene-acrylate copolymer contains 60 to 95 mol% of ethylene and 0.01 to 3 mol% of α,β-unsaturated carboxylic acid or anhydride thereof and has a melt index of Y g/10 min (190° C., 2160 g), where Y is the value that satisfies the following equation:

$$0.01 \cdot Z < Y < 100(Z + 10 \cdot X)$$

where X is the mol% of α,β-unsaturated carboxylic acid or anhydride thereof, and Z is the melt index (2 g/10 min (190° C., 2160 g)) of the saponified product of ethylene-vinyl acetate copolymer.

3. A resinous composition as claimed in claim 1, wherein the vinyl carboxylate component is represented by the formula

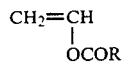
|
OCOR wherein R is a linear or branched alkyl group having 1 to 20 carbon atoms.

4. A resinous composition as claimed in claim 1, wherein the acrylate ester component is represented by the formula

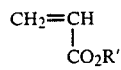
|
CO₂R'

(where R' is a linear or branched alkyl group having 1 to 20 carbon atoms.)

5. A molded article having impact resistance produced by melt-molding a resinous composition which comprises (A) 95 to 50 parts by weight of a saponified product of ethylene-vinyl acetate copolymer containing 20 to 60 mol % of ethylene and having a degree of saponification greater than 95% and (B) 5 to 50 parts by weight of a modified ethylene-vinyl carboxylate copolymer or modified ethylene-acrylate copolymer, said copolymers each being modified by a $C_3$–$C_{10}$ α,β-unsaturated carboxylic acid or anhydride thereof therewith, wherein each of said modified copolymers contain 60 to 85 mol % of ethylene and 0.01 to 3 mol % of an α,β-unsaturated carboxylic acid or an anhydride thereof.

6. A resinous composition as claimed in claim 5, wherein said modified ethylene-vinyl carboxylate copolymer or modified ethylene-acrylate copolymer contains 60 to 95 mol% of ethylene and 0.01 to 3 mol% of α,β-unsaturated carboxylic acid or anhydride thereof and has a melt index of Y g/10 min (190° C., 2160 g), where Y is the value that satisfies the following equation:

$$0.01 \cdot Z < Y < 100(Z + 10 \cdot X)$$

where X is the mol% of α,β-unsaturated carboxylic acid or anhydride thereof, and Z is the melt index (2 g/10 min (190° C., 2160 g)) of the saponified product of ethylene-vinyl acetate copolymer.

7. A molded article as claimed in claim 5, wherein the vinyl carboxylate component is represented by the formula

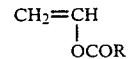
|
OCOR wherein R is a linear or branched alkyl group having 1 to 20 carbon atoms.

8. A molded article as claimed in claim 5, wherein the acrylate component is represented by the formula

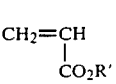
|
CO₂R' wherein R' is a linear or branched alkyl group having 1 to 20 carbon atoms.

9. A molded article as claimed in claim 5, which is produced by coextrusion with a thermoplastic resin.

10. A molded article as claimed in claim 9, wherein said thermoplastic resin is selected from polyethylene terephthalate, polyamide, polypropylene, polyethylene, polycarbonate, polystyrene, and polyvinyl chloride.

11. An impact resistant container of laminated structure formed by coextrusion of a resinous composition and one or more thermoplastic resins, said resinous composition comprising (A) 95 to 50 parts by weight of a saponified product of ethylene-vinyl acetate copolymer containing 20 to 60 mol % of ethylene and having a degree of saponification greater than 95% and (B) 5 to 50 parts by weight of a modified ethylene-vinyl carboxylate copolymer, said copolymers each being modified by a $C_3$–$C_{10}$ α,β-unsaturated carboxylic acid or anhydride thereof therewith, wherein each of said modified copolymers contains 60 to 95 mol % ethylene and 0.01 to 3 mol % of an α,β-unsaturated carboxylic acid or an anhydride thereof.

12. A resinous composition as claimed in claim 11, wherein said modified ethylene-vinyl carboxylate copolymer or modified ethylene-acrylate copolymer contains 60 to 95 mol% of ethylene and 0.01 to 3 mol% of α,β-unsaturated carboxylic acid or anhydride thereof and has a melt index of Y g/10 min (190° C., 2160 g), where Y is the value that satisfies the following equation:

$$0.01 \cdot Z < Y < 100(Z + 10 \cdot X)$$

where X is the mol% of α,β-unsaturated carboxylic acid or anhydride thereof, and Z is the melt index (Z g/10 min (190° C., 2160 g)) of the saponified product of ethylene-vinyl acetate copolymer.

13. A container as claimed in claim 5, wherein the vinyl carboxylate component is represented by the formula

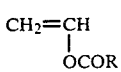
|
OCOR wherein R is a linear or branched alkyl group having 1 to 20 carbon atoms.

14. A container as claimed in claim 5, wherein the acrylate component is represented by the formula

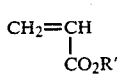
|
CO₂R' wherein R' is a linear or branched alkyl group having 1 to 20 carbon atoms.

15. A container as claimed in claim 11, wherein the inner layer is the resinous composition and the outer layer is a thermoplastic resin.

16. A container as claimed in claim 11, wherein the interlayer is made of the resinous composition of claim 1 and the inner and outer layers are made of a thermoplastic resin.

17. A container as claimed in claim 11, wherein said thermoplastic resin is selected from polyethylene terephthalate, polyamide, polypropylene, polyethylene, polycarbonate, polystyrene, and polyvinyl chloride.

* * * * *